US010663710B2

(12) United States Patent
Boamfa et al.

(10) Patent No.: US 10,663,710 B2
(45) Date of Patent: May 26, 2020

(54) ILLUMINATION UNIT FOR DIGITAL PATHOLOGY SCANNING

(71) Applicant: KONINKLIJKE PHILIPS N.V., Eindhoven (NL)

(72) Inventors: Marius Iosif Boamfa, Veldhoven (NL); Arnoldus Johannes Martinus Jozeph Ras, Mierlo (NL); Theodoor Bastiaan Johannes Haddeman, Eindhoven (NL)

(73) Assignee: KONINKLIJKE PHILIPS N.V., Endhoven (NL)

( * ) Notice: Subject to any disclaimer, the term of this patent is extended or adjusted under 35 U.S.C. 154(b) by 205 days.

(21) Appl. No.: 15/535,178

(22) PCT Filed: Feb. 19, 2016

(86) PCT No.: PCT/EP2016/053384
§ 371 (c)(1),
(2) Date: Jun. 12, 2017

(87) PCT Pub. No.: WO2016/142153
PCT Pub. Date: Sep. 15, 2016

(65) Prior Publication Data
US 2018/0024345 A1    Jan. 25, 2018

(30) Foreign Application Priority Data

Mar. 12, 2015 (EP) .................................... 15158750

(51) Int. Cl.
*G02B 21/36* (2006.01)
*G01N 21/64* (2006.01)
(Continued)

(52) U.S. Cl.
CPC ......... *G02B 21/364* (2013.01); *G01N 21/251* (2013.01); *G01N 21/64* (2013.01);
(Continued)

(58) Field of Classification Search
CPC .. G02B 21/364; G02B 5/0236; G02B 5/0278; G02B 21/086; G02B 21/365; G01N 21/251; G01N 21/64; G01N 2201/103
See application file for complete search history.

(56) References Cited

U.S. PATENT DOCUMENTS

| 6,238,076 B1 | 5/2001 | Pascale |
| 6,268,600 B1 | 7/2001 | Nakamura |

(Continued)

FOREIGN PATENT DOCUMENTS

| DE | 102008052829 A1 | 4/2010 |
| DE | 102010061786 A1 | 5/2012 |
| JP | 0317617 B2 | 6/2001 |
| JP | 2007333800 A | 12/2007 |

OTHER PUBLICATIONS http://www.led-tech.de/en/High-Power-LEDs-Edison/Ediline-IV-c_142_213.html.
http://www.led-tech.de/de/High-Power-LEDs-Edison/Edision-5630-Module/EdiLine-5630-PLCC-Modul-_T-2105_142_214.html.

*Primary Examiner* — Jamil Ahmed
(74) *Attorney, Agent, or Firm* — Sherry Austin

(57) ABSTRACT

The present invention relates to digital pathology, and relates in particular to a digital pathology scanner illumination unit. In order to provide digital pathology scanning with improved illumination, a digital pathology scanner illumination unit (10) is provided that comprises a light source (12), a light mixing chamber (14), and a light diffuser (16). The light source comprises a plurality of light elements (18) that are arranged longitudinally along a linear extension direction. The mixing chamber comprises a transparent volume (22) providing a mixing distance (DM) between the plurality of the light elements and the light diffuser such that light with a uniform intensity is provided at a downstream edge (26) of the mixing chamber; and the mixing chamber is arranged, in terms of light propagation, between the (Continued)

plurality of the light elements and the light diffuser. Further, the light diffuser comprises a diffusing material such that the light is transformed into light that has uniformity at different angles, in particular low angles.

14 Claims, 2 Drawing Sheets

(51) Int. Cl.
  *G02B 21/08* (2006.01)
  *G01N 21/25* (2006.01)
  *G02B 5/02* (2006.01)

(52) U.S. Cl.
  CPC ......... *G02B 5/0236* (2013.01); *G02B 5/0278* (2013.01); *G02B 21/086* (2013.01); *G02B 21/365* (2013.01); *G01N 2201/103* (2013.01)

(56) References Cited

U.S. PATENT DOCUMENTS

| | | |
|---|---|---|
| 2007/0253733 A1 | 11/2007 | Fey |
| 2008/0266875 A1 | 10/2008 | Chang |
| 2009/0097248 A1 | 4/2009 | Tsao |
| 2009/0103293 A1* | 4/2009 | Harbers .................... F21V 9/40 362/231 |
| 2009/0167189 A1* | 7/2009 | Wu .......................... F21V 11/08 315/112 |
| 2010/0315832 A1* | 12/2010 | Pijlman ................. G02B 6/005 362/607 |
| 2012/0312957 A1 | 12/2012 | Loney |
| 2013/0044205 A1* | 2/2013 | Matsumoto .............. G06K 9/00 348/86 |
| 2014/0247379 A1 | 9/2014 | Najmabadi |
| 2014/0313313 A1* | 10/2014 | Soenksen ............. G02B 21/002 348/79 |

* cited by examiner

US 10,663,710 B2

ILLUMINATION UNIT FOR DIGITAL PATHOLOGY SCANNING

CROSS-REFERENCE TO PRIOR APPLICATIONS

This application is the U.S. National Phase application under 35 U.S.C. § 371 of International Application No. PCT/EP2016/053584, filed on Feb. 19, 2016, which claims the benefit of European Patent Application No. 15158750.8, filed on Mar. 12, 2015. These applications are hereby incorporated by reference herein.

FIELD OF THE INVENTION

The present invention relates to digital pathology, and relates in particular to a digital pathology scanner illumination unit and a digital pathology scanner.

BACKGROUND OF THE INVENTION

Digital pathology is a field that is notably related to integrate pathology images in a clinical decision support system of a hospital, for example. This is achieved by making pathology slides available in a digital form, sometimes called virtual slides. Pathology slides are scanned by dedicated digital pathology scanners to make the images available for inspection in a digital form. Digital Pathology is also often associated to the so-called concept of Whole Slide Imaging. For the image acquisition procedure, the pathology slide must be illuminated. However, it has been shown that the quality of the illumination is a central aspect in terms of image content.

SUMMARY OF THE INVENTION

There may thus be a need to provide digital pathology scanning with improved illumination.

The object of the present invention is solved by the subject-matter of the independent claims, wherein further embodiments are incorporated in the dependent claims. It should be noted that the following described aspects of the invention apply also for the digital pathology scanner illumination unit as well as for the digital pathology scanner.

According to a first aspect of the present invention, a digital pathology scanner illumination unit is provided that comprises a light source, a light mixing chamber and a light diffuser. The light source comprises a plurality of light elements arranged longitudinally along a linear extension direction. The mixing chamber comprises a transparent volume providing a mixing distance between the plurality of the light elements and the light diffuser such that light with a uniform intensity is provided at a downstream edge of the mixing chamber. The mixing chamber is arranged, in terms of light propagation, between the plurality of the light elements and the light diffuser. Further, the light diffuser comprises a diffusing material such that the light is transformed into light having uniformity, in particular low angles.

In an example, the diffusing material of the light diffuser transforms light into light having uniformity even in a small angular range, which small angular range relates to light traveling orthogonal to the diffuser surface, close to the optic axis.

This results in improved quality of illumination for scanning pathology slides. By ensuring that light is emanated that has uniformity at different angles (uniform even if averaged over a small angular range), and in particular at low angles, the illumination unit is in particular suitable for so-called low NA (numerical aperture) images. For example, low NA images with a resolution of approximately 10 to 100 microns/pixel, for example corresponding to an NA value of approximately 0.1 or lower, typically approximately 0.05 or lower. As an example, the illumination unit can be used for low-resolution or preview purposes in a digital pathology scanner. In an example, the digital pathology scanner is provided with an imaging unit that is also suitable for high-resolution imaging purposes. As an example, the illumination unit can be used for a unit for low-resolution and high-resolution imaging. In another example, the digital pathology scanner is provided with two distinct imaging units. As an example, the illumination unit can be used for a low-resolution unit for the preview purposes in the digital pathology scanner. The actual slide scan can be performed by a high-resolution unit, which may also comprise an example of the illumination unit. By providing the above-mentioned illumination unit as a low-resolution unit, it is possible to preview the pathology slide such that the area of interest can be well identified. A good quality preview slide can lead to important savings in the total scan of the slide. For example, only the interesting areas need to be scanned by the high-resolution module afterwards. Further, the preview slide can also be used for other purposes, for example for following sub-regions of interest through a set of consecutive pathology slides or coups.

The term "digital pathology" relates to providing information from probes in form of digital slides, as indicated above. The term "probes" relates to samples that are provided to be imaged. For example, the probe is a stained tissue provided in form of a slide. An image is taken from a slice of tissue or fluid or other sample as a probe, and the image is then provided to an image management system in digital form. The acquired images are provided as pathology images (or pathology slides) similar to what can be provided by microscopy. Hence, the term digital microscopy or virtual microscopy can also be used. The digital slides allow viewing, analyzing and managing the data in a computer environment.

The term "digital pathology scanner" relates to a device provided for scanning probes to generate image data as digital slides. A probe can be provided, for example as a prepared or pre-treated probe, in order to be illuminated and scanned to acquire the image data in digital form. The scanner may be provided to be suitable for a facilitated acquisition of a large number or slides.

The term "low angles" relates to an angle between the output light and the normal of the output surface, wherein the angle is small.

In an example, the scanner provides a scanning of the slide in a scanning direction. The extension direction of the light source is orthogonal to the scanning direction of the digital pathology scanner. Hence, an illumination unit for a digital pathology scanner is provided. The digital pathology scanner has a scanning direction, along which tissue samples or other samples on slides are scanned.

The term "illumination unit" relates to a part of the scanner that provides the light for the actual scanning process, e.g. the pre-scan procedure. The "illumination unit" is provided to illuminate the probe to be able to detect respective image information by an imaging unit, also referred to as camera unit.

In an example, the light elements of the plurality of light elements are provided as distinct light elements. The term "distinct" relates to light sources that are arranged as individual light sources, which each provide a light sub-beam.

The plurality of the light sub-beams add up to form an illumination radiation or illumination beam, however with an intensity that still reflects the plurality of distinct light elements in the vicinity of the light source. The vicinity relates to a virtual plane in a distance range of approximately 0.5 mm (millimeter) to 20 mm in case of LEDs (light emitting diodes) as light sources.

The term "illumination unit" relates to a unit or component for generating light for further purposes.

The term "linear extension direction" relates to an arrangement of a pattern of light sources along a line, e.g. a straight or curved line. For example, a single row of LEDs is provided as a linear arrangement of light sources. In another example, a plurality of pairs of LEDs (i.e. two LEDs, or also three or four LEDs) is provided along a line. The LEDs are provided as an LED array.

The term "downstream edge" relates to the part or side of the mixing chamber where the light leaves the mixing chamber. The downstream edge can also be referred to as light leaving side. The opposite side of the mixing chamber can be referred to as "upstream edge" or light entering side.

The mixing chamber is arranged on top of the plurality of the (distinct) light elements, and the light diffuser is arranged on top of the mixing chamber. "On top" relates to an arrangement when light is emanated in an upward direction. The arrangement on top relates to an arrangement downstream (in light propagation direction), e.g. downstream of the light elements, or downstream of the mixing chamber.

The term "uniform intensity" relates to a modulation of intensity of maximum +/−5% of intensity variation along the extension of the light beam, i.e. across the light radiation direction. For example, a variation of maximum +/−2% or less is provided.

The expression "in terms of light propagation" relates to an arrangement where the light enters the mixing chamber on one side and leaves the light on another side, e.g. on an opposite side.

In an example, the mixing chamber is having a cubic shape or form, and the mixing chamber is arranged such that the light source (the plurality of the light elements) is arranged on one side and the light diffuser is arranged on the other, i.e. opposite side.

In another example, the mixing chamber is having a U-, C- or L-shape (or U-, C- or L-form), and the mixing chamber is arranged such that the light source (the plurality of the elements) is arranged on one side and the light diffuser is arranged on the other side in terms of the light propagation within the volume given by the shape or form, such that, for example in a U- or C-shaped mixing chamber, the light source and the light diffuser are arranged next to each other in a geometrical way. For example, light enters the U at one end of the U and leaves the U at the other end of the U. Hence, light source and light diffuser would be arranged so to speak next to each other at the respective ends of the U.

In an example, the light diffuser transforms the light from a uniform intensity averaged over all angles into a uniform intensity for all individual angles, in particular for the angles close to normal to the emitting surface. For example, low numerical aperture (NA) imaging is provided with illumination angles very close to the normal, i.e. the light is almost plan parallel and very little divergent.

After the mixing chamber the exiting light is uniform in intensity when averaged over all possible angles. The role of the (volume) diffuser is to provide a subsequent mixing of all the light modes such that the light intensity profile becomes uniform even when averaged over small angular ranges.

The "uniform intensity averaged over all angles" relates to an intensity that is uniform if considered in a field of the possible angles. However, for individual angles, the intensity may show variations.

The "uniform intensity for all individual angles" relates to an intensity that is uniform even if considered for small angular ranges or even separate angles. In an example, the light is transformed into light with a uniform intensity even in a small angular range, provided at the downstream edge of the light diffuser.

The term "angular uniform intensity" relates to a modulation of angular intensity of maximum +/−5% of angular intensity variation along the extension of the light beam (or light illumination radiation). For example, a variation of maximum +/−2% or less is provided. The term "angular" intensity relates to the intensity of the light in different radiation directions as seen from the particular point of reference on the downstream edge or light leaving side of the diffuser.

The term approximately refers to a deviation in the range of maximum +/−15%, e.g. +/−10%, preferably +/−1% of the respective given value.

The light mixing chamber, also referred to as light mixing box, provides spatial uniformity of the radiation. The light diffuser in addition provides the angular mixing, i.e. angular uniformity of the radiation.

The uniformity of the light emanating from the light diffuser is provided as a light distribution along the linear extension direction in a plane of approximately 20 mm above the mixing chamber in form of a distribution graph that is having a range of values within a deviation of a mean value of approximately 5%.

According to an example, the light diffuser is provided as a volume light diffuser.

The term "volume light diffuser" relates to a diffuser that is made from light scattering material that provides that entering light spreads out in different directions, wherein the spreading out or scattering is provided as multiple scattering along the cross-section of the light diffuser. This is expressed by using the word "volume". The volume light diffuser can also be referred to as thick volume light diffuser.

According to an example, the volume light diffuser is provided as a light scattering translucent plate with a thickness of at least 3 mm.

According to an example, the light elements are provided as LEDs. For example, the LEDs are provided as an LED bar. The LEDs may be arranged on a printed circuit board (PCB).

According to an example, the mixing chamber is provided with a mixing chamber height of minimum 20 mm, e.g. 40 mm, and a mixing chamber length of minimum 40 mm, e.g. 70 mm or 80 mm.

The mixing chamber height refers to the extension of the mixing chamber in the light radiation direction perpendicular to the longitudinal extension. The mixing chamber length refers to the extension of the mixing chamber in the longitudinal or linear extension direction. The direction transverse to the mixing chamber length is referred to as mixing chamber width. The light elements may be provided in a repetitive manner where the light elements are arranged with a pitch.

In an example, the mixing chamber is provided with a height of 40 mm and a length of 70 mm. For example, the light elements are arranged with a distance to each other of approximately 3 mm, e.g. the light elements are arranged with a pitch of 3 mm.

According to an example, the mixing chamber is provided as a light guide channel with a channel depth in light radiation direction. The light guide channel is enclosed on the sides by reflective sidewalls that provide the light guidance. The light guide channel is provided as a continuous medium allowing light in a straight direction to be transmitted in an unaffected manner, i.e. at least theoretically without any diffraction or deflection inside the channel. In other words, the light guide channel is provided free of inner or integral light reflection surfaces or elements except for the side walls provided as reflecting structures to ensure total internal reflection (TIR) for the light radiation provided by the light elements in different directions. Hence, in an example, the mixing chamber is a space free from optically effective other structures, wherein the space is either empty or filled up with a transparent material.

According to an example, the mixing chamber is provided as a solid block made from a transparent material with a refractive index larger than 1. For example, the solid block is made from glass or transparent plastic material.

In an example, the solid block is provided as a continuous one-piece material with no internal structures. Hence, light is affected only in form of the reflection on the sidewalls.

According to an example, the mixing chamber is provided as an air (containing) mixing cavity enclosed by side walls covered with a reflective coating. Hence, light is affected only in form of the reflection on the sidewalls.

According to an example, a cover is provided on top of the light diffuser that comprises an aperture for light emanating from the light diffuser.

In an example, the aperture of the cover is provided with a size at least as large as the upper exit size of the light diffuser.

In an example, the aperture of the cover is provided with an opening length of approximately 65 mm and an opening width of 3-5 mm. In an example of a mixing chamber having a length of 80 mm, an opening length of the aperture of approximately 75 mm is provided. The operating length relates to a direction along the linear extension direction, the opening width relates to a transverse direction. In an example, the cover is provided with an aperture that is smaller than the cross-section of the mixing chamber, i.e. smaller than the light exit area or surface of the mixing chamber.

According to an example, the digital pathology scanner illumination unit is provided as an illumination sub-module configured to be combined with at least one further illumination sub-module in the linear extension direction. The light elements are provided along the linear extension direction with a pitch and the first and the last light elements of each sub-module are arranged to a sideward edge of the mixing chamber with a distance of half the pitch.

In the direction transverse to the linear extension direction, the distinct light elements are provided in a centered manner, i.e. in the middle of the mixing chamber. In an example, a uniform line illumination for low NA imaging is achieved. For example, a range for NA<0.1 is provided, e.g. a value or range of NA<0.05.

In an example, the low NA is due to an imaging optics attached to the imaging device; for example, a lens placed on a camera.

In one example, a low ratio is provided for LED pitch/height of the mixing chamber.

For example, a combination of a mixing chamber with a volume diffuser is provided that transforms the uniform optical energy profile over all angles at the exit of the mixing chamber in a uniform energy profile at low viewing angles, to be used in low NA imaging.

In an example, the following dimensions are provided. The mixing chamber is provided to have a size of approximately 10 mm (width)×40 mm (height)×70 mm (length. In an example, the diffuser is provided to have a thickness of approximately 3 mm. In an example, the diffuser is provided to have the same size of the exit of the mixing chamber, e.g. a size of approximately 10 mm (width)×70 mm (length) and the height of 3 mm. In another example, the diffuser is provided to have a size of approximately 14 mm (width)×74 mm (length)×3 mm (height), such that the diffuser is larger than the mixing chamber, i.e. larger than the exit of the mixing chamber.

In an example, the material of the mixing chamber is a transparent medium, e.g. glass, plastic or similar material. In another example, the mixing chamber is provided as an empty case mixing chamber, but with reflective material on the sides.

As an option, the aperture in the cover is provided as a slit that is smaller than the size of the diffuser. In an example, the slit is also smaller than the cross-section of the mixing chamber.

In an example, a ratio of LED pitch/height of the mixing chamber is provided in a range of approximately $1/5$ to $1/20$. In an example, a ratio of approximately $1/10$ is provided. If the ratio is too large, the degree of mixing is decreased; if the ratio is too low, an impractically high mixing chamber would result.

According to a second aspect of the present invention, a digital pathology scanner is provided. The digital pathology scanner comprises an object receiving device, an illumination device, an imaging device and an image data processor. The object receiving device is configured to receive at least one pathology slide comprising a probe to be analyzed. The digital illumination device comprises a digital pathology scanner illumination unit according to one of the above-mentioned examples that is configured to illuminate the pathology slide. The imaging device is configured to acquire images of the illuminated pathology slide. Further, the image data processor is configured to generate image data of the respective images and to provide the image data for further purposes.

In an example, the digital illumination device comprises a digital pathology scanner illumination unit according to one of the preceding examples that is configured to illuminate the pathology slide in a scanning manner. Further, the imaging device may be configured to acquire images of the illuminated pathology slide in a relative scanning movement.

The term scanning manner may also be referred to illumination in a "transmission way", which relates to illumination light that transmits a tissue slide and that then is projected to an image sensor, e.g. during a scanning movement.

For image acquisition, the imaging device and the slide are moved in relation to each other, e.g. by moving the slide along the (at least temporarily fixed) imaging device, or by moving the imaging device along the temporarily fixed slide, or by moving both along each other. The scanning movement is provided along a scanning direction. During the scan, also the illumination unit may be moved relative to the slide, e.g. together with the imaging unit, for example aligned or synchronized with the relative movement.

According to an example, for image acquisition, a relative scanning movement of the pathology slide and the digital illumination device as well as the imaging device in relation to each other is provided along a scanning direction. The linear extension direction of the light source is arranged transverse to the scanning direction.

In an example, the linear extension direction of the light source is arranged orthogonal (approximately 90°) to the scanning direction. In an example, deviations from 90° in a range about +/− 10° are provided, e.g. +/− 5°.

According to an example, an imaging optics is provided that comprises at least one lens. The imaging optics is arranged between the object receiving device, i.e. the sample, and the imaging device. The imaging optics is configured for low NA imaging with a range of the NA lower than 0.1.

The imaging optics can also be referred to as optics arrangement comprising a lens system. For example, the NA is provided to be lower than 0.1, such as lower than 0.05.

According to an example, the digital pathology scanner illumination unit is provided for low-resolution imaging. The illumination device further comprises a high-resolution illumination unit that is provided for high-resolution imaging.

The term "low resolution" is provided for preview purposes, to be followed by a high resolution imaging, for which the high-resolution illumination unit is provided. For the respective imaging, or image data detection, a same imaging unit of the imaging device can be provided for both low and high resolution imaging according to a further example. In another example, the imaging device comprises a low resolution imaging unit and a high-resolution imaging unit.

The term "low resolution" relates to a resolution of approximately 10-50 microns/pixel.

The term "high resolution" relates to a resolution of approximately 0.25-0.5 microns/pixel.

According to an example, the object receiving device provides a receiving plane with a distance to the mixing chamber of approximately 20 mm.

In an example, the receiving plane is arranged in a distance to the diffuser of approximately 20 mm.

The digital pathology scanner illumination unit relates to a unit used for imaging pathology slides, i.e. slides with a sample tissue or tissue probe or fluid probe.

According to an aspect, a mixing chamber is arranged between a longitudinal light source comprising a number of individual light elements that for themselves lead to an uneven distribution of light across the length of the arrangement. In other words, such arrangement provides light radiation, in which the individual light sources can be identified due to the non-uniformity of the light beam. However, by providing the light mixing chamber, a first attempt is provided in order to align the light sources such that the light is having uniform intensity before the light enters a light diffuser. The light diffuser provides a second attempt for providing uniformity of the light beam, namely to provide a uniform also in respect to the uniformity at different angles. As a consequence, a uniform light beam is provided that is having improved illumination characteristics in order to be able to generate scans of a pathology slide with improved quality, for example as pre-scans or preview slides, or also for actual slide scans having high resolution.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
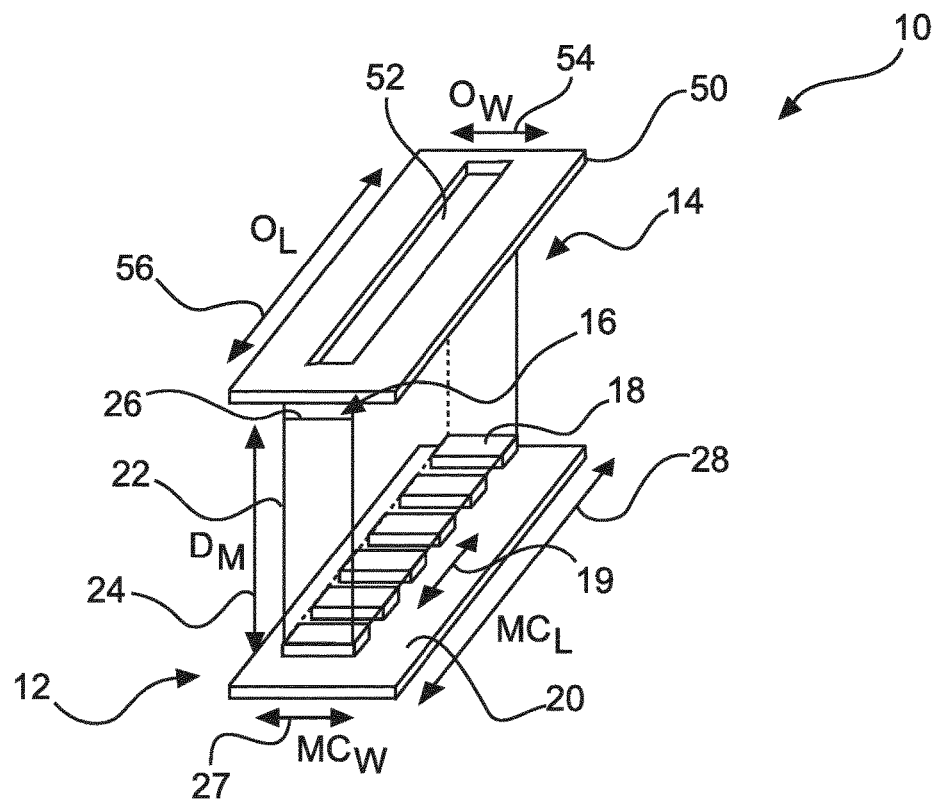
FIG. 1 schematically shows a perspective view of an example of a digital pathology scanner illumination unit.

FIG. 1 shows a perspective schematic illustration of a digital pathology scanner illumination unit 10 with a light source 12, a mixing chamber 14 and a light diffuser 16. The light source 12 is provided with a plurality of light elements 18, for example LEDs mounted on a printed circuit board 20. The light elements 18 are arranged longitudinally along a linear extension direction, indicated with an arrow 19.

The mixing chamber 14 comprises a transparent volume 22 providing a mixing distance $D_M$, indicated with a first double arrow 24 between the plurality of the light elements 18 and the light diffuser 16, such that light with a uniform intensity is provided at a downstream edge 26 of the mixing chamber 14. The mixing chamber 14, or light mixing chamber, is arranged, in terms of light propagation, between the plurality of light elements 18 and the light diffuser 16. The light diffuser 16 comprises a diffusing material such that the light is transformed into light having uniformity at different angles, in particular low angles. The mixing chamber 14 is having a mixing chamber width $MC_W$, and the mixing distance $D_M$ could also be referred to as mixing chamber height, $MC_H$. Further, the mixing chamber 14 is having a mixing chamber length, $MC_L$.

The mixing chamber width $MC_W$ is indicated with a double arrow 27, and the mixing chamber length $MC_L$ is indicated with a further double arrow 28.

Figures 2A, 2B:
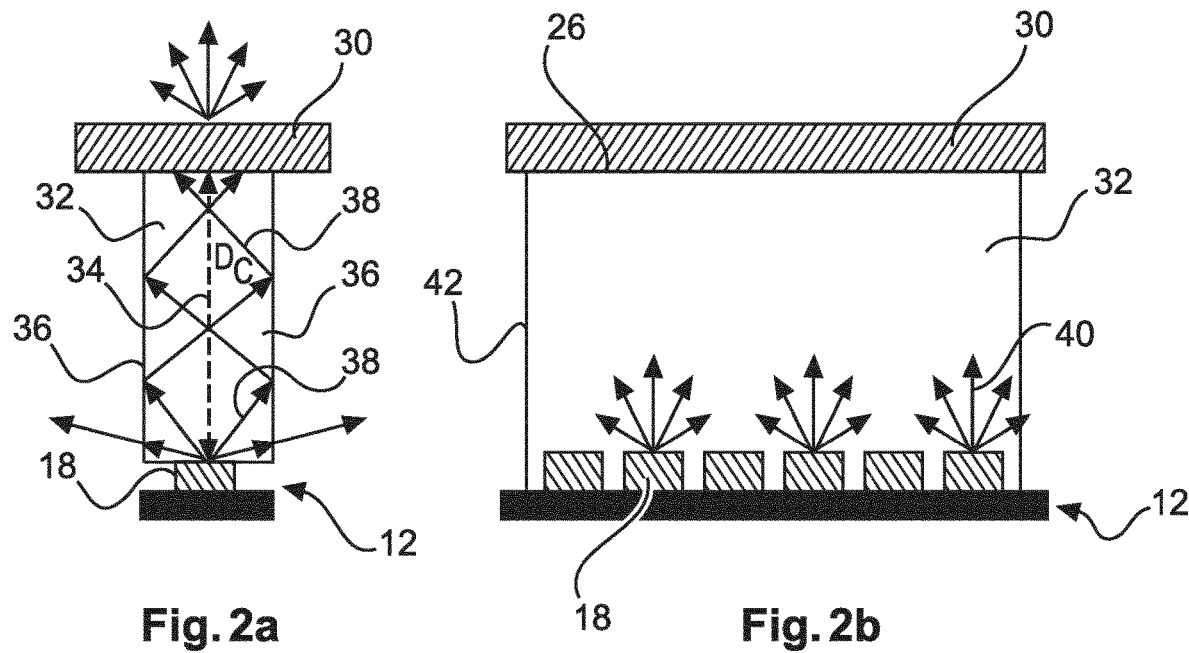
FIG. 2A shows a schematic cross-section through an example of a digital pathology scanner illumination unit.
FIG. 2B shows a longitudinal cross-section in a schematic illustration of the illumination unit of FIG. 2A.
Figure 3:
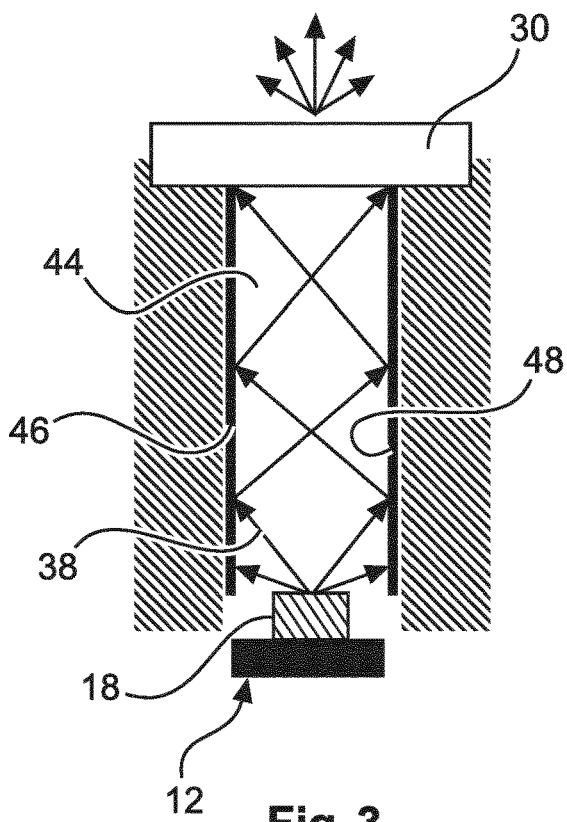
FIG. 3 shows a further example of a cross-section through a digital pathology scanner illumination unit.

For example, the light diffuser 16 is provided as a volume light diffuser, for example as a light scattering translucent plate 30 (see also FIGS. 2A, 2B and 3). The translucent plate 30 may have a thickness of at least 3 mm.

The mixing chamber may have a mixing chamber height, or mixing distance $D_M$, of minimum 20 mm and a mixing chamber length $MC_L$ of minimum 40 mm, for example 80 mm.

It is noted that in FIG. 1, the mixing chamber 14 is provided with a length such that the mixing chamber is arranged covering the extension of the light elements 18. However, in an option (see also below), the mixing chamber 14 is provided with a length such that a distance from the last light element 18, e.g. a last LED, to the wall of the mixing chamber 14 is 0.5 (i.e. half) of the distance between the other light elements 18. This portion is shown in FIG. 2b, where the mixing chamber is having side walls (i.e. the walls at the side ends) that are arranged such that the distance to the LEDs is half the distance between the LEDS, e.g. to allow a combination (not shown) of several such mixing chambers along the extension direction, covered by a light diffuser arrangement comprising several light diffusers that are combined in a similar way along the extension direction. In another example, a light diffuser arrangement comprises a continuous light diffuser (plate) extending across several mixing chambers.

The mixing chamber 14 is provided as a light guide channel 32, as indicated in FIG. 2A and FIG. 3 that are showing cross-sections of two different embodiments. The light guide channel 32 has a channel depth $D_C$, indicated in FIG. 2A with a double arrow 34, which is similar to the mixing distance $D_M$. The light guide channel is enclosed on the sides by reflective side walls 36 that provide the light guidance. In FIG. 2A, the light source 12 is schematically indicated with one of the light elements 18, for example an LED, that emanates light, as indicated with thin line arrows 38. The light is reflected on the inner sides of the reflective sidewalls.

In FIG. 2B, the light source 12 is shown with a number of the plurality of the light elements 18, but only for three of them, respective light emanation radiation is indicated by respective arrows 40.

FIGS. 2A and 2B show an example where the mixing chamber 14 is provided as a solid block 42 made from a transparent material with a refractive index larger than 1. Hence, the light emanating from the light source 12, i.e. the light elements 18, is being mixed in the mixing chamber such that light with a uniform intensity is provided at the downstream edge 26 of the mixing chamber 12. The light diffuser 16 then provides that the light is transformed into light having uniformity at different angles. This is provided, in an example, as indicated above, with the light scattering translucent plate 30.

The solid block 42 can be provided as glass or transparent plastic material. In another example, shown in FIG. 3, the mixing chamber 12 is provided as an air mixing cavity 44 enclosed by side walls 46 covered with a reflective coating 48.

As an option, a cover 50 is provided, as indicated in FIG. 1. The cover 50 is provided on the light diffuser 16 and the cover comprises an aperture 52 for light emanating from the light diffuser 16. The aperture 52 may be provided as a slit having an opening width $O_W$, indicated with double arrow 54 and an opening length $O_L$, indicated with a double arrow 56. The slit is smaller than the upper edge of the diffuser, and may also be smaller than a cross-section of the mixing chamber.

The cover is provided for the example of the solid material mixing chamber, and also for the air-guide mixing chamber. As a further option, the digital pathology scanner illumination unit 10 is provided as an illumination sub-module that is configured for a combination with at least one further illumination sub-module in the linear extension direction.

The light elements 18 are provided along the linear extension direction with a pitch and the first and the last light elements of each sub-module are arranged to a sideward edge of the mixing chamber with a distance of half the pitch. This allows a combination of sub-modules, but keeps the appearance of the light elements constant across the abutting end faces of the adjacent sub-modules.

Figure 4:
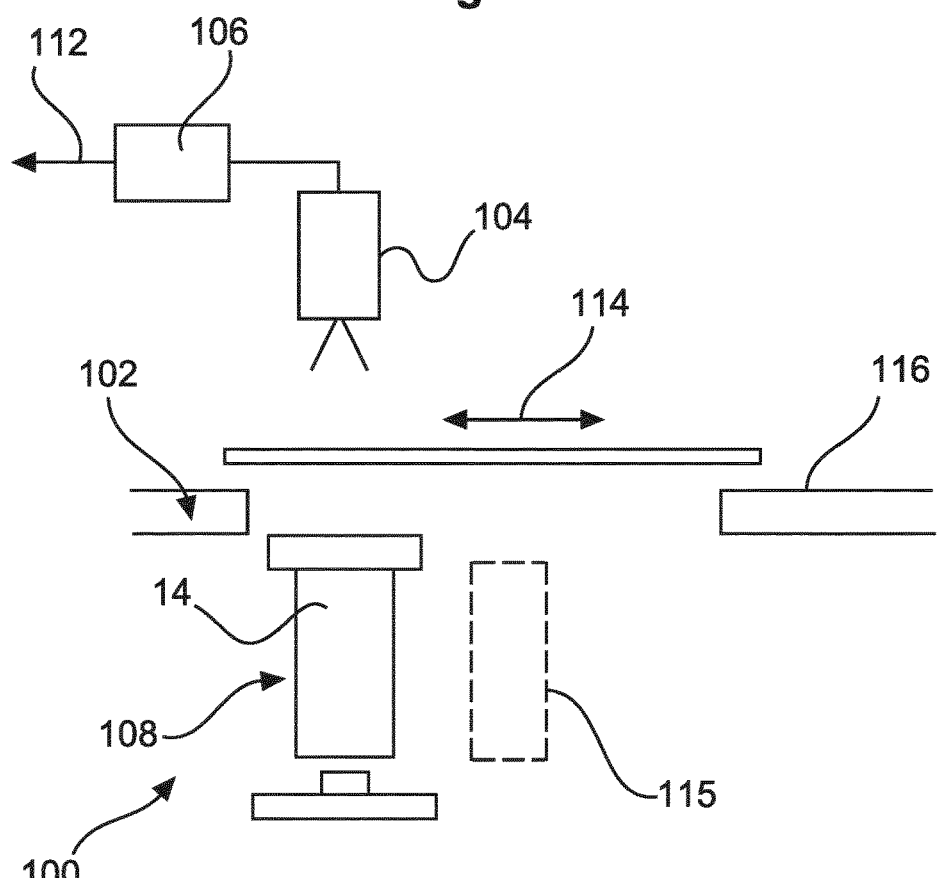
FIG. 4 shows an example of a digital pathology scanner in a schematic illustration.

FIG. 4 shows an example of a digital pathology scanner 100 comprising an object receiving device 102, an imaging device 104 and image data processor 106. The imaging device 104 is arranged above the object receiving device 102. Further, an illumination device 108 is provided according to one of the above-mentioned examples of the digital pathology scanner illumination unit 10. The illumination device 108 is arranged below, i.e. opposite the object receiving device 102. This allows a transmissive illumination of a probe. An image can be provided in a transmission mode. For a reflective mode, the imaging device 104 would have to be arranged on the same side as the illumination device 108. The object receiving device 102 is configured to receive at least one pathology slide 110 comprising a probe to be analyzed. The digital illumination device 108, i.e. the digital pathology scanner illumination unit 10, provides illumination towards the pathology slide 110 such that the imaging device 104, which is configured to acquire images of the illuminated pathology slide 110, can generate image data and transfer same to the image data processor 106. The image data processor 106 is configured to generate image data of the respective images and to provide the image data for further purposes, as indicated with arrow 112.

For image acquisition, a relative scanning movement (indicated with a double arrow 114) of the pathology slide and the digital illumination device as well as the imaging device in relation to each other is provided along a scanning direction.

As an option, an imaging optics (not shown) can be provided that comprises at least one lens. The imaging optics can be arranged between the slide 110 and the camera, i.e. the imaging device 104. The imaging optics can be configured for low NA imaging with a range of the NA lower than 0.1. For example, an NA value of lower than 0.05 is provided.

The digital pathology scanner illumination unit 10 may be provided for low resolution imaging. As an option, also indicated in FIG. 4, the illumination device 108 further comprises a high resolution illumination unit 115 for high resolution imaging.

As a further option, the object receiving device 102 is providing a receiving plane 116 with a distance to the mixing chamber 14 of approximately 20 mm.

According to an aspect, not further shown in detail, a combination of light mixing and light diffusion is provided to achieve uniform illumination of the surface of interest, for example a pathology slide even at low NA imaging. As mentioned above, in a first step, the light of individual sources is mixed with the help of a mixing box, e.g. the mixing chamber, to achieve spatial uniformity and subsequently a diffuser, for example a volume diffuser, is used to produce angular position mixing. Hence, the role of the mixing chamber is to achieve a uniform illumination at the top exit of the mixing chamber. However, at this point, the individual modules/LEDs may still be visible when observed at low NA. Therefore, subsequently, the diffuser, preferably the volume diffuser, is used to ensure uniform illumination even when investigated at low NA.

As an effect, the light at the exit of the mixing chamber is uniform when all angles are observed, however at lower angles the individual LED modules may still be visible. Therefore, the volume diffuser is used to solve this.

In an example, to ensure optimal mixing conditions, the geometry of the mixing chamber is matched with the pitch of the individual modules. The distance between the last LED and the edge of the imaging chamber is provided to be half the pitch of the individual LEDs.

As a result, an illumination unit with an improved quality of emanating light is provided to account for imaging quality. For example, the improved illumination allows a facilitated identification of tissue area and also of slight defects.

It has to be noted that embodiments of the invention are described with reference to different subject matters. However, a person skilled in the art will gather from the above and the following description that, unless otherwise notified, in addition to any combination of features belonging to one type of subject matter, also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or components, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

The invention claimed is:

1. A digital pathology scanner illumination unit, comprising:
    a light mixing chamber;
    a light diffuser; and
    a plurality of light emitting diodes arranged longitudinally along a linear extension direction, wherein light emanates from a side of each of the light emitting diodes that is parallel to the linear extension direction;
    wherein the mixing chamber comprises a transparent volume providing a mixing distance ($D_M$) between the plurality of light emitting diodes and the light diffuser such that light with a uniform intensity is provided at a downstream edge of the mixing chamber, and wherein the mixing chamber is arranged, in terms of light propagation, between the plurality of light emitting diodes and the light diffuser;
    wherein the light diffuser comprises a diffusing material such that the light is transformed into light having uniformity at different angles, in particular low angles;
    wherein the light mixing chamber is provided as a first step of aligning the light such that the light is having uniform intensity before the light enters the light diffuser, and the light diffuser is provided subsequently for ensuring uniform illumination also in respect to the uniformity at different angles; and
    wherein uniformity of the light emanating from the light diffuser is provided as a light distribution along a linear extension direction.

2. The digital pathology scanner illumination unit of claim 1, wherein the light diffuser is provided as a volume light diffuser.

3. The digital pathology scanner illumination unit of claim 1, wherein the mixing chamber is provided with a mixing chamber height ($MC_B$) of minimum 20 mm and a mixing chamber length ($MC_L$) of minimum 40 mm.

4. The digital pathology scanner illumination unit of claim 1, wherein the mixing chamber is provided as a light guide channel with a channel depth ($D_C$) in light radiation direction; and
    wherein the light guide channel is enclosed on the sides by reflective side-walls that provide the light guidance.

5. The digital pathology scanner illumination unit of claim 1, wherein the mixing chamber is provided as a solid block made from a transparent material with a refractive index larger than 1.

6. The digital pathology scanner illumination unit of claim 1, wherein the mixing chamber is provided as an air mixing cavity enclosed by side walls covered with a reflective coating.

7. The digital pathology scanner illumination unit of claim 2, wherein the volume light diffuser is provided as a light scattering translucent plate with a thickness of at least 3 mm.

8. The digital pathology scanner illumination unit of claim 1, wherein a cover is provided on the light diffuser; wherein the cover comprises an aperture for light emanating from the light diffuser.

9. The digital pathology scanner illumination unit of claim 1, wherein the digital pathology scanner illumination unit is provided as an illumination sub-module configured to be combined with at least one further illumination submodule in the linear extension direction;
    wherein the plurality of light emitting diodes are provided along the linear extension direction with pitch; and
    wherein a first and a last of the plurality of light emitting diodes of each sub-module are arranged to a sideward edge of the mixing chamber with a distance of half the pitch.

10. A digital pathology scanner, comprising:
    an object receiving device;
    an illumination device;
    an imaging device; and
    an image data processor;
    wherein the object receiving device is configured to receive at least one pathology slide comprising a probe to be analyzed;
    wherein the illumination device comprises the digital pathology scanner illumination unit of claim 1 that is configured to illuminate the pathology slide;
    wherein the imaging device is configured to acquire images of the illuminated pathology slide; and
    wherein the image data processor is configured to generate image data of the respective images and to provide the image data for further purposes.

11. The digital pathology scanner of claim 10, wherein for image acquisition, a relative scanning movement of the pathology slide and the illumination device as well as the imaging device in relation to each other is provided along a scanning direction; and
    wherein the linear extension direction of the plurality of light emitting diodes is arranged transverse to the scanning direction.

12. The digital pathology scanner of claim 10, wherein an imaging optics is provided that comprises at least one lens;
    wherein the imaging optics is arranged between the object receiving device and the imaging device; and
    wherein the imaging optics is configured for low NA imaging with a range of the NA lower than 0.1.

13. The digital pathology scanner of claim 10, wherein the digital pathology scanner illumination unit is provided for low-resolution imaging; and
    wherein the illumination device further comprises a high-resolution illumination unit for high-resolution imaging.

14. The digital pathology scanner of claim 10, wherein the object receiving device provides a receiving plane with a distance to the mixing chamber of approximately 20 mm.

* * * * *